United States Patent [19]
Barone et al.

[11] Patent Number: 6,090,234
[45] Date of Patent: Jul. 18, 2000

[54] ELASTIC LAMINATES AND METHODS FOR MAKING THE SAME

[75] Inventors: Daniel Louis Barone; William Robert Ouellette, both of Cincinnati, Ohio

[73] Assignee: The Procter & Gamble Company, Cincinnati, Ohio

[21] Appl. No.: 08/915,831

[22] Filed: Aug. 21, 1997

Related U.S. Application Data

[63] Continuation-in-part of application No. 08/680,472, Jul. 15, 1996.

[51] Int. Cl.[7] .............................. B32B 31/08; B32B 31/20
[52] U.S. Cl. .................... 156/177; 156/179; 156/244.15; 156/292; 156/296; 156/308.2; 428/110
[58] Field of Search ..................................... 156/177, 178, 156/179, 292, 296, 244.15, 441, 308.2; 264/DIG. 81; 428/110

[56] References Cited

U.S. PATENT DOCUMENTS

| | | |
|---|---|---|
| 4,062,995 | 12/1977 | Korpman . |
| 4,300,562 | 11/1981 | Pieniak . |
| 4,310,594 | 1/1982 | Yamazaki et al. . |
| 4,333,782 | 6/1982 | Pieniak . |
| 4,414,970 | 11/1983 | Berry . |
| 4,522,863 | 6/1985 | Keck et al. . |
| 4,525,407 | 6/1985 | Ness . |
| 4,573,991 | 3/1986 | Pieniak et al. . |
| 4,606,964 | 8/1986 | Wideman . |
| 4,652,487 | 3/1987 | Morman . |
| 4,720,415 | 1/1988 | Vander Wielen et al. . |
| 4,789,699 | 12/1988 | Kieffer et al. . |
| 4,834,741 | 5/1989 | Sabee . |
| 4,841,958 | 6/1989 | Ersfeld et al. . |
| 4,856,502 | 8/1989 | Ersfeld et al. . |
| 4,957,795 | 9/1990 | Riedel . |
| 4,977,011 | 12/1990 | Smith . |
| 4,984,584 | 1/1991 | Hansen et al. . |
| 5,151,092 | 9/1992 | Buell et al. . |
| 5,156,793 | 10/1992 | Buell et al. . |
| 5,167,897 | 12/1992 | Weber et al. . |
| 5,187,005 | 2/1993 | Stahle et al. . |
| 5,209,801 | 5/1993 | Smith . |
| 5,230,701 | 7/1993 | Meyer et al. . |
| 5,334,446 | 8/1994 | Quantrille et al. . |
| 5,352,497 | 10/1994 | Patel . |
| 5,393,599 | 2/1995 | Quantrille et al. . |
| 5,470,639 | 11/1995 | Gessner et al. . |
| 5,503,908 | 4/1996 | Faass . |

FOREIGN PATENT DOCUMENTS

| | | |
|---|---|---|
| 0672776 | 9/1995 | European Pat. Off. . |
| WO 97/11839 | 4/1997 | WIPO . |
| WO 98/03322 | 1/1998 | WIPO . |
| WO 98/05491 | 2/1998 | WIPO . |

*Primary Examiner*—Sam Chuan Yao
*Attorney, Agent, or Firm*—Loy M. White; Betty J. Zea; T. David Reed

[57] ABSTRACT

The present invention relates to elastic laminate structures comprising an open cell polymeric mesh integrally thermal bonded between two fabric carrier layers and methods for manufacturing such laminates.

17 Claims, 3 Drawing Sheets

ELASTIC LAMINATES AND METHODS FOR MAKING THE SAME

This is a continuation-in-part of application Ser. No. 08/680,472, filed on Jul. 15, 1996.

FIELD OF THE INVENTION

This invention relates generally to the field of elastic laminates and, more particularly, to elastic laminates formed from a polymeric mesh and two fabric layers, wherein improved elasticity and comfort are provided.

BACKGROUND OF THE INVENTION

Elastic laminates have previously been used in a variety of products including elastic absorbent structures such as sweat bands, bandages, diapers, incontinence devices. Several methods for producing these elastic laminates also currently exist. For example, U.S. Pat. No. 4,606,964 to Wideman teaches the joining of a gatherable material to each side of a tensioned elastic web. The gatherable materials are joined in a pre-tensioned state to the elastic web by self-adhering compounds, adhesives or thermal bonding. When the tension in the elastic web is released after joining, the web contracts thereby collecting the gatherable material into folds.

U.S. Pat. No. 4,522,863 to Keck et al. discloses an elastic laminate comprising a mesh having a tissue layer attached to one side and a layer of microfibers attached to the other. The tissue and microfiber layers are attached to the mesh by adhesive, and portions of the layers remain unbonded to the mesh to provide a soft, cloth-like feel and appearance.

U.S. Pat. No. 4,977,011 to Smith teaches a elastic laminate having outer layers of low-basis weight breathable material, a central elastic layer, and an adhesive layer that serves to join all the layers together. The elastic layer can be formed from either a single elastic strand laid between pins to form a multiplicity of non-intersecting lines of elastic, or, alternatively, by a plurality of elastic strands intersecting at right angles and adhesively joined to the low basis weight breathable material.

Although the above-described elastic laminates may be suitable for the purposes for which they were intended, it is desirable to provide an improved elastic laminate having additional benefits and features. For example, the previously described structures provide strands which extend in two distinct directions across the structure (or, alternatively, teach a complex method for aligning a single strand in a single direction between pins). When resulting elastic laminates such as these are cut, however, the cut edges of the strands can protrude on cut sides of the structure such that they can be a source of irritation if the structure is worn next to the body, as is the case with bandages, body wraps, diapers, incontinence devices and the like. Further, if an elastic laminate having a large modulus value (i.e., the ratio of stress to strain) is desired, elastic strands having a large cross-sectional area are generally required. However, large strands of this type can produce a rough or "nubby" feeling when placed in contact with the body. Consequently, it would be desirable to further provide an elastic laminate which can provide elastic strands lo having large cross-sectional areas and yet which is still comfortable to be worn about the body. The present invention provides an improved elastic laminate and method for forming such structure which can accommodate designs having the above-described structural features and benefits.

SUMMARY OF THE INVENTION

The present invention relates to a method of manufacturing elastic laminate structures comprising the steps of:

a) providing a first carrier layer;

b) providing a second carrier layer;

c) providing a mesh, disposed between said first and second carrier layers, having a plurality of first strands intersecting a plurality of second strands, said first and second strands having a softening temperature at an applied pressure, wherein said softening temperature of said second strands, at said applied pressure, is greater than said softening temperature of said first strands at said applied pressure;

d) heating said mesh to said softening temperature of said first strands and less than said softening temperature of said second strands;

e) applying a bonding pressure to said first strands; and f) integrally bonding from about 10% to about 100% of said first strands to said first and second carrier layers.

All percentages and ratios used herein are by weight, and all measurements made at 25° C., unless otherwise specified.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION OF THE INVENTION

Figure 1:
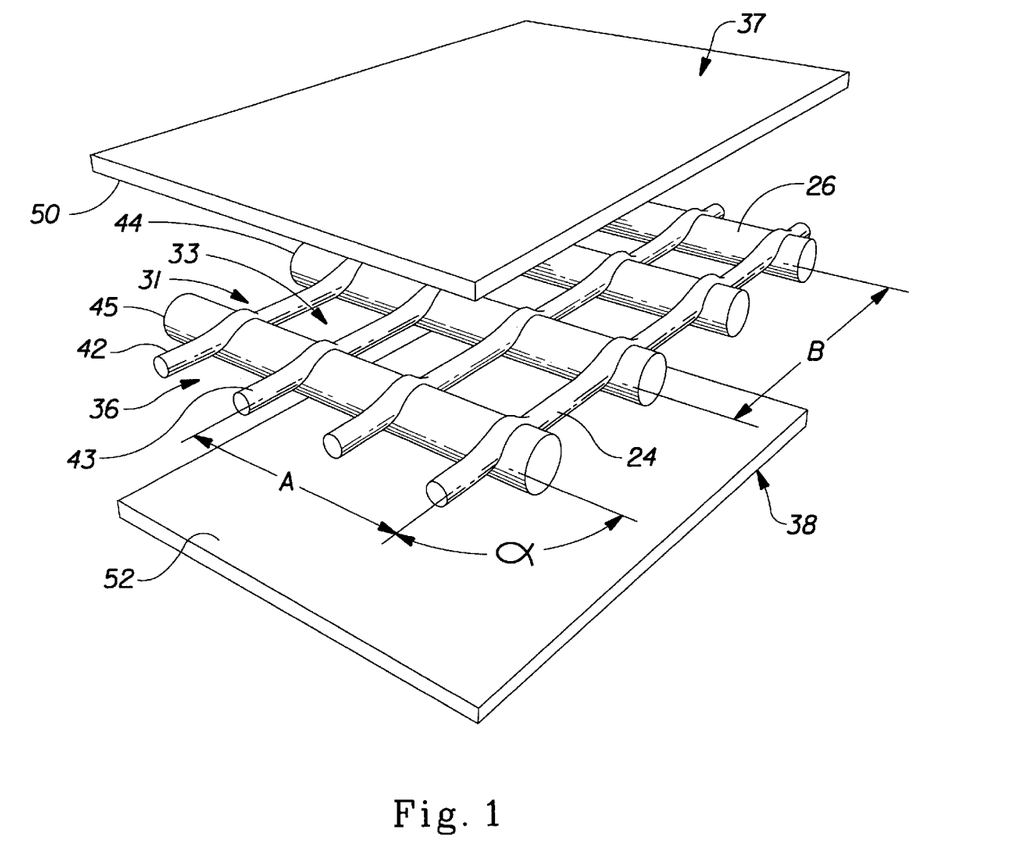
FIG. 1 is an exploded view of a mesh and first and second carrier layers prior to being formed into a elastic laminate made in accordance with the present invention.
Figure 2:
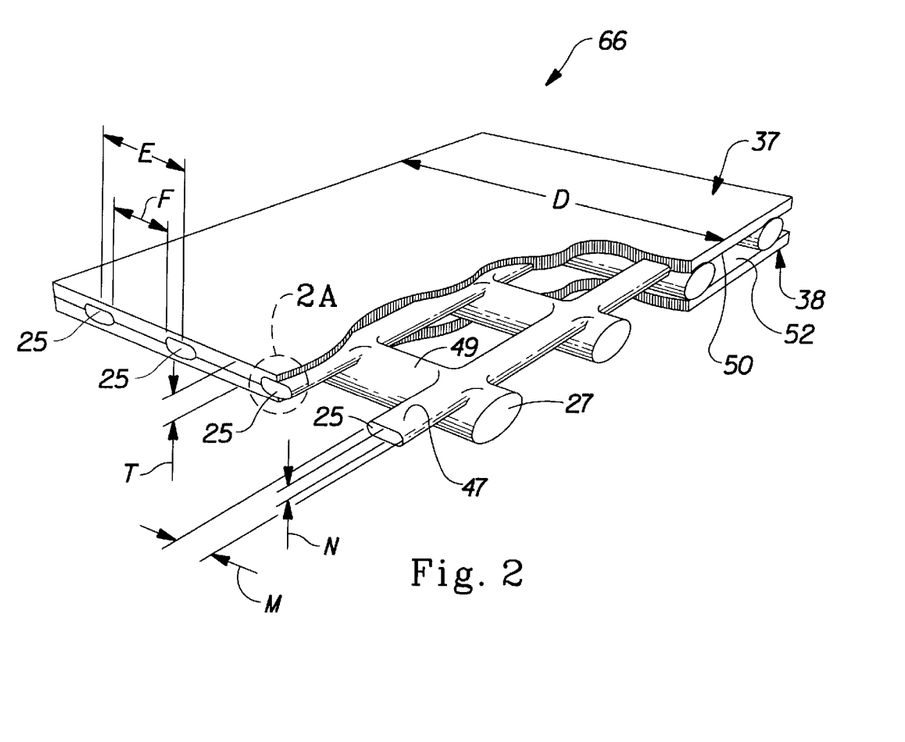
FIG. 2 is a partial perspective view of a elastic laminate made in accordance with the present invention, wherein a portion of the first and second carrier layers have been removed to show the integrally bonded first strands.

Reference will now be made in detail to the present preferred embodiments of the invention, examples of which are illustrated in the accompanying drawings wherein like numerals indicate the same elements throughout the views. FIG. 1 is an exploded view of the components of thermal bonded elastic laminate 66 prior to its formation (elastic laminate 66 is shown in FIG. 2). As illustrated, elastic laminate 66 is formed from an elastic mesh 36 having a plurality of first strands 24 and a plurality of second strands 26, disposed between, and integrally thermal bonded to, a first carrier layer 37 and a second carrier layer 38. As shown in FIG. 2, elastic laminate 66 preferably has at least on structural direction D, wherein at least a portion of structural direction D is elastic. More preferably, elastic laminate 66 provides a structural direction D which is elastic along the direction and entire length of second strands 26. While it is preferred that first and second carrier layers 37 and 38 are substantially coextensive, it is contemplated that they may be provided in differing shapes and sizes from each other, as desired. It is also contemplated that the elastic laminate structures of the present invention can incorporate a plurality of elastic meshes which are integrally bonded to one or more carrier layers.

As used herein, the phrase "structural direction" (e.g., D) is intended to mean a direction which extends substantially along and parallel to the plane of first and second carrier layers 37 and 38. Elastic laminate 66 can be incorporated into a variety of products (not illustrated) wherein it is desired to provide at least one structural direction which is partially or entirely elastic along its length. Examples of such products include elastic diapers, incontinence products, bandages, body wraps and the like.

Although it is preferred that elastic laminate 66 provide at least one structural direction D which is elastic, it is further contemplated that elastic laminate 66 can be inelastic such that no elastic structural directions are provided. Alternatively, elastic laminate 66 can also be provided with a structural direction over which a portion of the length thereof is elastic and a portion of the length thereof is inelastic.

As used herein, "elastic" refers to that property of a material whereby the material, when subjected to a tensile force, will stretch or expand in the direction of the force and will essentially return to its original untensioned dimension upon removal of the force. More specifically, the term "elastic" is intended to mean a directional property wherein an element or structure has a recovery to within about 10% of its original length $L_o$ after being subjected to a percent strain $\epsilon_\%$ of greater than 50%. As used herein, percent strain $\epsilon_\%$ is defined as:

$$\epsilon_\% = [(L_f - L_o)/ L_o]* 100$$

Where $L_f$=Elongated Length $L_o$=Original Length

For consistency and comparison, the recovery of an element or structure is preferably measured 30 seconds after release from its elongated length $L_f$. All other elements or structures will be considered inelastic if the element or structure does not recover to within about 10% of its original length $L_o$ within 30 seconds after being released from a percent strain $\epsilon_\%$ of 50%. Inelastic elements or structures would also include elements or structures which fracture and/or permanently/plastically deform when subjected to a percent strain $\epsilon_\%$ of 50%.

Referring now to FIGS. 1 and 2, elastic mesh 36 comprises a plurality of first strands 24 which intersect or cross (with or without bonding to) a plurality of second strands 26 at nodes 31 at a predetermined angle α, thereby forming a net-like open structure having a plurality of apertures 33. Each aperture 33 is defined by at least two adjacent first strands (i.e., 42 and 43) and at least two adjacent second strands (i.e., 44 and 45) such that apertures 33 are substantially rectangular (preferably square) in shape. Other aperture configurations, such as parallelograms or circular arc segments, can also be provided. Such configurations could be useful for providing non-linear elastic structural directions. It is preferred that first strands 24 are substantially straight and substantially parallel to one another, and, more preferably, that second strands 26 are also substantially straight and substantially parallel to one another. Most preferably, first strands 24 intersect second strands 26 at nodes 31 at a predetermined angle α of about 90 degrees. Each node 31 is an overlaid node, wherein first strands 24 and second strands 26 are preferably joined or bonded (although it is contemplated that joining or bonding may not be required) at the point of intersection with the strands still individually distinguishable at the node. However, it is believed that other node configurations such as merged or a combination of merged and overlaid would be equally suitable.

Although it is preferred that first and second strands 24 and 26 be substantially straight, parallel, and intersect at an angle α of about 90 degrees, it is noted that first and second strands 24 and 26 can intersect at other angles α, and that first strands 24 and/or second strands 26 can be aligned in circular, elliptical or otherwise nonlinear patterns relative to one another. Although for ease of manufacture it is contemplated that first and second strands 24 and 26 have a substantially circular cross-sectional shape prior to incorporation into laminate structure 66, first and second strands 24 and 26 can also have other cross-sectional shapes such as elliptical, square, triangular or combinations thereof.

The material of first strands 24 is chosen so that first strands 24 can maintain second strands 26 in relative alignment prior to forming laminate structure 66. It is also desirable that the materials of first and second strands 24 and 26 be capable of being deformed (or initially formed) into predetermined shapes upon application of a predetermined pressure or a pressure in combination with a heat flux, as described in more detail hereafter. These deformed shapes (i.e., elliptical second strands, substantially flat first strands and the like) provide laminate structure 66 which can be comfortably worn about the body without irritation or other discomfort. It is further desirable that the material chosen for first strands 24 provide an adhesive-like property for joining a portion of second strand outer surface 49 of deformed second strands 27 to a portion of first carrier layer inner surface 50 and second carrier layer inner surface 52.

Figure 2A:
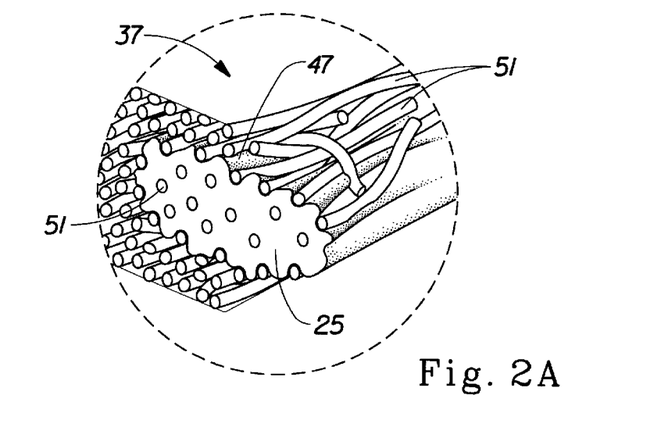
FIG. 2A is an enlarged partial perspective view of an integrally bonded first strand of the elastic laminate of FIG. 2.

The material of first strands 24 should also be capable of integrally bonding with carrier layers 37 and 38 as part of forming laminate structure 66. As described in more detail hereafter, first strands 24 can be integrally bonded to carrier layers 37 and 38 by application of a pressure or a pressure in combination with a heat flux. As used herein, the phrase "integrally bonded" and its derivatives is intended to mean that a portion of a strand outer surface (i.e., first strand outer surface 47) of an integrally bonded strand (i.e., integrally bonded first strands 25) has penetrated into and bonded with carrier layer 37 and 38. The portion of the strand outer surface of an integrally bonded strand which penetrates carrier layer 37 and 38 can bond mechanically (i.e., as by encapsulating, encircling or otherwise engulfing) and/or chemically (i.e., polymerizing, fusing or otherwise chemically reacting) with fibers 51 of carrier layers 37 and 38, as shown in FIG. 2A. With regard to penetration, integrally bonded means that a portion of the strand outer surface has penetrated at least about 10%, preferably at least about 25%, more preferably at least about 50%, even more preferably at least about 75%, most preferably about 100% of carrier layer structural thickness T of carrier layers 37 and 38 in laminate structure 66. Further, because integrally bonded strands enhance the comfort of laminate structures 66 when worn about the body, at least about 10%, preferably at least about 50%, more preferably at least about 90%, most preferably 100% of first strands 24 are integrally bonded to carrier layers 37 and 38 of laminate structure 66.

The above described benefits can be achieved by selecting a first strand to material having a softening temperature, which is lower than the softening temperature of second strands 26 relative to the processing pressures used to form laminate structures 66. As used herein, the phrase "softening temperature" is intended to mean the minimum temperature at which a material begins to flow under an applied pressure to facilitate integral bonding of the material to a carrier layer or layers. Typically, heat is applied to a material to achieve a softening temperature. This generally results in a decrease in the viscosity of the material which may or may not involve a "melting" of the material, the melting being associated with a latent heat of fusion. Thermoplastic materials tend to exhibit a lowering in viscosity as a result of an increase in temperature allowing them to flow when subjected to an applied pressure. It will be understood that as the applied pressure increases, the softening temperature of a material decreases and therefore a given material can have a plurality of softening temperatures because the temperature will vary with the applied pressure. For ease of manufacturing and processing, and when utilizing generally polymeric materials for strands 24 and 26, it is preferred that the softening temperature of first strands 24 be lower, preferably at least about 10° C. lower, more preferably at least about 20° C. lower, than the softening temperature of second strands 26 when both materials are subjected to the same applied pressure (e.g., the processing pressure). As used herein, the phrase "bonding pressure", is intended to mean the pressure which facilitates the integral bonding of first strands 24 to carrier layers 37 and 38, without integrally bonding second strands 26 to carrier layers 37 and 38, when both strands are at the softening temperature of first strands 24 but below the softening temperature of second strands 26. In addition to the selection of first and second strand materials for softening point temperature, second strands 26 are preferably formed from a material which renders second strands 26 appropriately elastic such that laminate structure 66 provides a structural direction along the direction of second strands 26 which is also appropriately elastic as desired.

Polymers such as polyolefins, polyamides, polyesters, and rubbers (i.e., styrene butadiene rubber, polybutadiene rubber, polychloroprene rubber, nitrile rubber and the like) have been found to be suitable, but not limited to, materials for forming the first and second strands of elastic mesh 36. Other materials or compounds (i.e., adhesive first strands) having different relative softening temperatures or elasticity can be substituted so long as the material provides the previously described benefits. Additionally, adjunct materials can be added to the base materials comprising first and second strands (i.e., mixtures of pigments, dyes, brighteners, heavy waxes and the like) to provide other desirable visual, structural or functional characteristics. Elastic mesh 36 may be formed from one of a variety of processes known in the art.

For ease of manufacture and cost efficiency, carrier layers 37 and 38 are preferably formed from, but not limited to, a non-woven fabric having fibers formed, for example, from polyethylene, polypropylene, polyethylene terepthalate, nylon, rayon, cotton or wool. These fibers can be joined together by adhesives, thermal bonding, needling/felting, or other methods known in the art to form carrier layers 37 and 38. Although it is preferred that carrier layers 37 and 38 are formed from a non-woven fabric, other fabrics such as wovens and knits, would be suitable.

The softening temperature of carrier layers 37 and 38 (at the subject processing pressures) should be greater than any of the processing temperatures applied to elastic mesh 36 in forming laminate structure 66. In addition, carrier layers 37 and 38 preferably have a modulus of less than about 100 gm force per cm at a unit strain $\epsilon_\mu$ of at least about 1 (i.e., $L_f$=2 $\times L_o$) in a direction along second strands 26 when it is formed into laminate structure 66. As used herein, the term "modulus" is intended to mean the ratio of an applied stress $\sigma$ to the resulting unit strain $\epsilon_\mu$, wherein stress $\sigma$ and strain $\epsilon_\mu$ are:

$$\sigma = F_a / W$$

$$\epsilon_\mu = (L_f - L_o) / L_o$$

Where
  $F_a$=Applied force
  $W$ =Orthogonal dimension of the element or structure subjected too the applied force $F_a$ (typically the structure width)
  $L_f$=Elongated length
  $L_o$=Original length For example, a 20 gram force applied orthogonally across a 5 cm wide fabric would have a stress $\sigma$ of 4 grams force per cm. Further, if the original length $L_o$ in the same direction as the applied force $F_a$ were 4 cm and the resulting elongated length $L_f$ were 12 cm, the resulting unit strain $\epsilon_\mu$ would be 2 and the modulus would be 2 grams force per cm.

It is believed that a carrier layer having a modulus of less than about 100 grams force per cm in a subject fabric direction will, when the subject fabric direction is juxtaposed co-directional with elastic second strands 26 in laminate structure 66, provides a laminate structure 66 with a modulus along the direction of second strands 26 that is largely a function of the material properties, size and arrangement of second strands 26. In other words, the modulus of carrier layers 37 and 38 will be low enough that the modulus of the second strands 26 will largely determine the modulus of laminate structure 66 in the subject direction. This configuration is especially useful if it is desired that laminate structure 66 provides an elastic structural direction along the direction of deformed laminate second strands 27.

If carrier layers 37 and 38 do not inherently provide the desired modulus, carrier layers 37 and 38 can be subjected to an activation process before or after forming laminate structure 66. As taught for instance in U.S. Pat. No. 4,834,741, issued to Sabee on May 30, 1989, incorporated in its entirety herein by reference, subjecting carrier layers 37 and 38 to an activation process (either separately or as part of laminate structure 66) will plastically deform carrier layers 37 and 38 such that it will provide the desired modulus. In an activation process, such as that taught by Sabee, carrier layer 37 and 38 (or laminate structure 66 incorporating same) is passed between corrugated rolls to impart extensibility thereto by laterally stretching carrier layers 37 and 38 in the cross-machine direction. Carrier layers 37 and 38 are incrementally stretched and drawn to impart a permanent elongation and fabric fiber orientation in the cross-machine direction. This process can be used to stretch carrier layers 37 and 38 before or after joinder of laminate structure 66. This preferably provides a laminate structure which can be extended in an elastic structural direction with minimal force as carrier layers 37 and 38 (and any additional layers) have initially been "activated" or separated in this direction, thereby providing a low modulus in the subject direction such that the laminate structure modulus is primarily a function of laminate second strands 27.

Laminate structure 66 is preferably formed by juxtaposing carrier layers 37 and 38 and elastic mesh 36 and applying a predetermined pressure or a predetermined pressure and heat flux, depending upon the selected materials for carrier layers 37 and 38 and elastic mesh 36, so that first strands 24 are integrally bonded to carrier layers 37 and 38. In addition to integrally bonding first strands 24 to carrier layers 37 and 38, it is desirable that the above described process deform first strands 24 so that the shape of integrally bonded first strand outer surface 47 is substantially flat. The phrase "substantially flat" and its derivatives, as used herein, means that integrally bonded first strands 25 have a major dimension M (i.e., the largest dimension parallel to the major axis of the strand cross section as shown in FIG. 2) at least about 2 times the length of a minor dimension N (i.e., the smallest dimension parallel to the minor axis of the strand cross section as shown in FIG. 2) Thus, it should be clear that an integrally bonded first strand 25 can have irregularities in outer surface 47 (i.e., peaks and valleys and the like, as shown in FIG. 2A) and still be within the intended meaning of substantially flat. More preferably, it is desirable that a portion of outer surface 47 of integrally bonded first strands 25 is also substantially coplanar with carrier layer inner surfaces 50 and 52 such that minor dimension N is about equal to or less than structural thickness T of carrier layers 37 and 38 and substantially all of minor dimension N is located within structural thickness T, as generally shown in FIG. 2. It is further contemplated that variations in the substantially flat and coplanar shapes of integrally bonded first strands 25 can occur along the length of first strands 25 without deviating from scope of these definitions. In other words, due to processing variations, it is noted that portions of integrally bonded first strands 25 can be substantially flat and/or coplanar while other portions along the same strand may not. These configurations are still considered to be within the definitions of substantially flat and coplanar as set forth above.

The above-described shapes of integrally bonded first strands 25 advantageously provide laminate structure 66, wherein strands 25 do not protrude in a manner which would cause irritation or other discomfort when laminate structure 66 is cut (thereby exposing the ends of integrally bonded first strands 25) and worn about the body. As such, at least about 25%, preferably at least about 50%, more preferably at least about 75%, and most preferably about 100% of integrally bonded first strands 25 are substantially flat and coplanar.

In contrast to the substantially flat and coplanar shape of integrally bonded first strands 25 of laminate structure 66, laminate second strands 27 are preferably only joined (as opposed to integrally bonded) to carrier layers 37 and 38 inner surfaces 50 and 52, as shown in FIG. 2, by application of the above described pressure and heat flux. It is contemplated, however, that second strands 26 can also be integrally bonded to carrier layers 37 and 38 if so desired. The integral bonding of first strands 24 to carrier layers 37 and 38 can also be performed such that first strands 24 act as an adhesive to intermittently join second strands 26 to carrier layer inner surfaces 50 and 52 at nodes 31. Alternatively, second strands 26 can comprise a self-adhering material which aids in joining a portion of second strand outer surfaces 49 to carrier layer inner surfaces 50 and 52.

Figure 3:
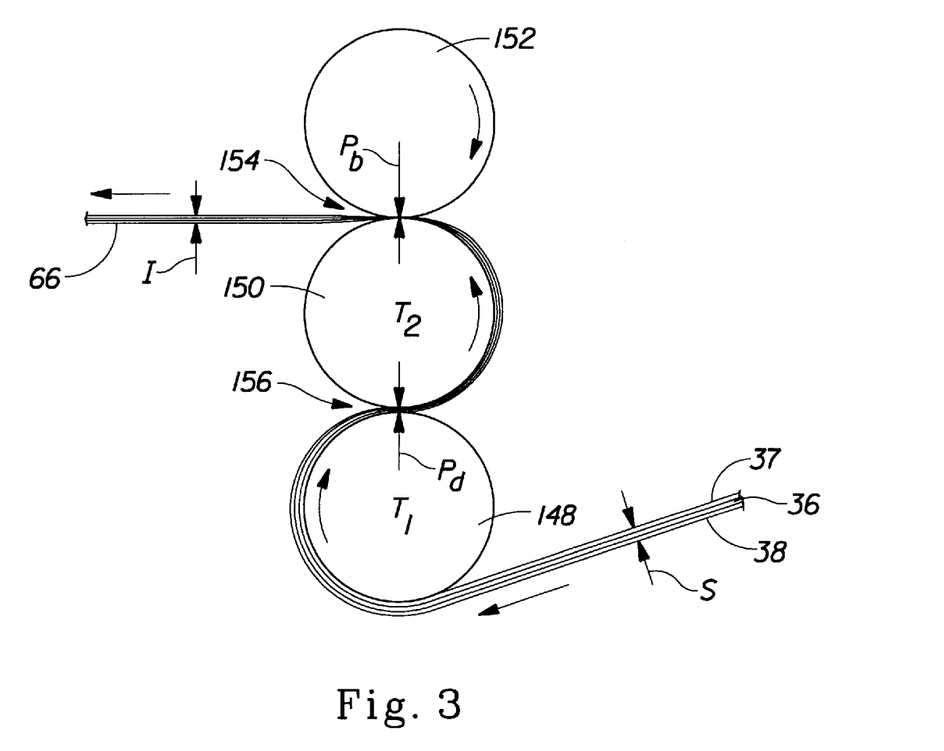
FIG. 3 is a schematic representation of a manufacturing process according to the present invention for forming the elastic laminate of FIG. 2.

As seen in FIG. 3, laminate structure 66 is preferably manufactured by a process comprising a substantially non-resilient first surface 148 (i.e., formed from steel or the like), a substantially non-resilient second surface 150, and a substantially resilient third surface 152 (i.e., formed from a silicone or other deformable rubber), wherein these surfaces are provided in the form of rollers. First surface 148 is spaced adjacent second surface 150 such that gap 156 is formed therebetween, while second surface 150 and third surface 152 are positioned in surface contact to one another thereby forming interference nip 154. Gap 156 is preferably sized such that first strands 24 and second strands 26 pass easily therethrough. Alternatively, gap 156 may be sized such that second strands 26 are deformed by passing therethrough.

First carrier layer 37 is juxtaposed adjacent to elastic mesh 36 which is juxtaposed adjacent to second carrier layer 38 such that when fed around first surface 148, as seen in FIG. 3, elastic mesh 36 is disposed between first carrier layer 37 and second carrier layer 38. Preferably, first strands 24 of elastic mesh 36 are juxtaposed adjacent inner surface 50 of first carrier layer 37 and second strands 26 are juxtaposed adjacent inner surface 52 of second carrier layer 38. First carrier layer 37 is preferably oriented adjacent first surface 148. First surface 148 is heated to a temperature $T_1$ which, in combination with the feed rate of juxtaposed first carrier layer 37, elastic mesh 36 and second carrier layer 38 over first surface 148, raises the temperature of first strands 24 to, or above, their softening temperature. Because of the low applied pressure $P_d$ at gap 156, first strands 24 and second strands 26 undergo little if any deformation thereat.

After juxtaposed first carrier layer 37, elastic mesh 36, and second carrier layer 38 pass through gap 156, second carrier layer 38 is preferably oriented adjacent second surface 150 and disposed between second surface 150 and elastic mesh 36 and first carrier layer 37. Second surface 150 is preferably heated to a temperature $T_2$ which in combination with the feed rate of juxtaposed first carrier layer 37, elastic mesh 36, and second carrier layer 38 over second surface 150, raises the temperature of second strands 26 to their softening temperature. Juxtaposed first carrier layer 37, elastic mesh 36, and second carrier layer 38 then pass through interference nip 154, wherein first strands 24 are integrally bonded to first and second carrier layers 37 and 38 by the application of bonding pressure $P_b$ from second and third surfaces 150 and 152 at nip 154. Resilient third surface 152 provides bonding pressure $P_b$ which is uniformly applied to first strands 24 between second strands 26 due to the conforming nature of resilient third surface 152. More preferably, the application of pressure $P_b$ from third surface 152 and heat flux from second surface 150 at temperature $T_2$ is sufficient to deform first strands 24 into substantially flat shaped and integrally bonded first strands 25. Most preferably, the application of pressure and heat flux is sufficient to deform first strands 24 into integrally bonded first strands 25 which are substantially coplanar with inner surface 50 of first carrier layer 37 and inner surface 52 of second carrier layer 38.

In contrast, at least about 25%, preferably at least about 50%, more preferably at least about 75%, most preferably about 100%, of second strands 26 are deformed into a substantially elliptical shape at nip 154 because pressure $P_b$ is fully applied to second strands 26 by second surface 150. The elliptical cross-sectional shape of second strands 27 is desirable if the undeformed cross section of the second strands 26 would otherwise produce a "nubby" or rough feel when laminate structures 66 is worn about the body. Preferably, the post-nip structural thickness I of laminate structure layer 66 is about 50% of the pre-nip structural thickness S of juxtaposed first carrier layer 37, first elastic mesh 36, and second carrier layer 38.

The feed rate of juxtaposed first carrier layer 37, elastic mesh 36, and second carrier layer 38 through first, second, and third surfaces 148, 150, and 152 can be adjusted so that first and second strands 24 and 26 have a sufficient residence time adjacent heated first and second surfaces 148 and 150 so that these strands can be softened and deformed as described herein.

Based upon the foregoing described process, it has been found that the following will form satisfactory laminate structures 66 having an elastic structural direction along the direction of laminate second strands 27: first and second carrier layers 37 and 38 preferably comprise a carded non-woven formed from thermally bonded polypropylene and having a 32 g/m² basis weight, a fiber size of about 2.2 denier per filament, a caliper of between about 0.01 cm to about 0.03 cm, a modulus of about 100 grams force per cm at a unit strain $\epsilon_u$ of 1 (such a fabric being marketed by Fibertech, Landisville, N.J., as Phobic Q-1); and elastic mesh 36 comprises a mesh wherein first strands 24 are formed from polyethylene and second strands 26 are formed from a styrene or butadiene block copolymer (such a mesh being manufactured by Conwed, Minneapolis, Minn. and marketed as T50018). Specifically, the juxtaposed Phobic Q-1 fabric, T50018 mesh, and Phobic Q-1 fabric, having a pre-formed structural thickness S of from about 0.09 cm to about 0.13 cm, preferably from about 0.10 cm to about 0.12, more preferably about 0.11 cm, are fed at a rate of from about 6 to about 14, more preferably from about 7 to about 12, most preferably from about 8 to about 10 meters per minute, over first surface 148 which is heated to a temperature $T_1$ of from about 71° C. to about 141° C., preferably from about 130° C. to about 141° C., more preferably from about 137° C. to about 139° C. In a preferred arrangement, gap 156 is preferably greater than or equal to 0.13 cm. Preferably, second surface 150 is heated to a temperature $T_2$ of from about 71° C. to about 141° C., preferably from about 130° C. to about 141° C., more preferably 137° C. to about 139° C., as the juxtaposed fabrics and mesh pass over second surface 150 and through inference nip 154. Pressure $P_b$ at nip 154 is preferably from about 55 to about 85 kilograms per centimeter, more preferably from about 70 to about 75 kilograms per centimeter. After the juxtaposed fabrics and mesh emerge from nip 154, the resulting thermal bonded elastic laminate 66 has a thickness I of from about 0.05 cm to about 0.09 cm, preferably from about 0.06 cm to about 0.08 cm, more preferably about 0.07 cm.

Figure 4:
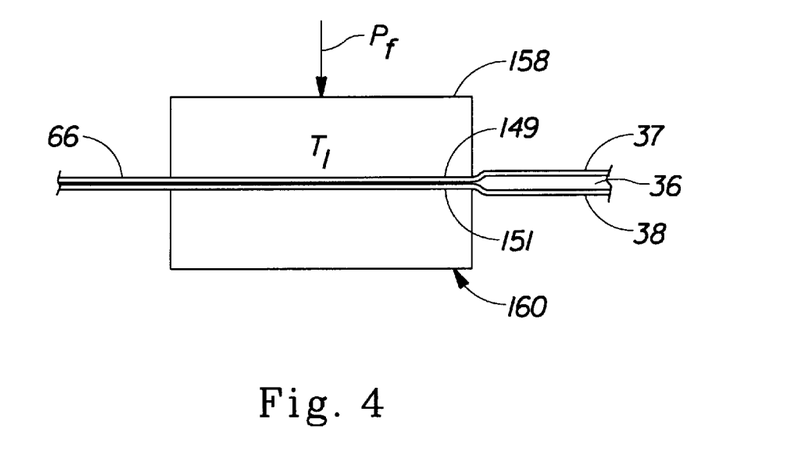
FIG. 4 is a schematic representation of a plate process according to the present invention for forming the elastic laminate of FIG. 2.

In addition to forming a laminate structure of the present invention via the above described process, such laminate structures can also be formed by a process providing a first plate 158 and a second plate 160, such as shown in FIG. 4. In contrast to the process discussed previously, first plate surface 149 preferably is substantially non-resilient, while second plate surface 151 is substantially resilient. First plate surface 149 is preferably heated to temperature $T_1$. A bonding pressure $P_f$ is applied to the juxtaposed fabrics and mesh by moving first plate surface 149 toward second plate surface 151 appropriately. Because temperature $T_1$ heats first strands 24 to their softening temperature for the applied bonding pressure $P_f$, application of the bonding pressure $P_f$ integrally bonds first strands 24 to first carrier layer 37 and second carrier layer 38. More preferably, application of the bonding pressure $P_f$ also deforms first strands 24 into a substantially flat shape which is also coplanar with inner surface 50 of the first carrier layer 37 and inner surface 52 of second carrier layer 38. Most preferably, application of bonding pressure $P_f$ also deforms second strands 26 into a substantially elliptical shape.

Using the Phobic Q-1 fabrics and T50018 mesh combination described above, satisfactory laminate structure 66 having first strands 24 integrally bonded to first and second carrier layers 37 and 38 can be provided if first plate 158 is heated to a temperature $T_1$ of from about 110° C. to about 130° C. and a bonding pressure $P_f$ of between 350 to 700 grams force per cm² is applied between about 10 and about 20 seconds.

It is believed that properly selecting the strand density, strand cross-sectional area, and/or the melt index of first strands 24 ( if first strands 24 are formed of a polymer) is necessary in order to provide laminate structures 66 having an elastic structural direction along the direction of the second strands 27. Improper selection of strand density, strand cross-sectional area, and/or melt index of first strands 24 can result in a laminate structure wherein portions of integrally bonded first strands 25 can overlap or merge together in laminate structure 66. Such merging or overlap of integrally bonded first strands 25 can result in only small portions of laminate second strands 27 being able to extend or elongate when subjected to a tensile force, as opposed to the elongation being distributed along substantially the entire length of substantially all of laminate second strands 27 absent this overlap. To minimize this condition, the strand density, strand cross-sectional area, and/or melt index of first strands 24 should be selected such that integrally bonded first strands 25 have a strand coverage $S_c$ of less than about 50%. As used herein, the phrase "strand coverage" is intended to be a measure of the amount of surface area of first carrier layer inner surface 50 and second carrier layer inner surface 52 which is in contact with integrally bonded first strands 25 of the present invention. Strand coverage $S_c$ is defined as:

$$S_c = (E-F)/E * 100$$

Where

E=strand centerline distance between any adjacent integrally bonded first strands 25, as shown in FIG. 2

F=strand edge distance F between any adjacent integrally bonded first strands 25, as shown in FIG. 2

The measurements of E and F can be taken at any cross section through laminate structure 66 of the present invention between any adjacent integrally bonded first strands 25.

The phrase "strand density", as used herein, is intended to mean the number of subject strands per centimeter along a strand transverse to the subject strands. For example, first strands 24 have a strand density which can be measured over a predetermined length A of a second strand 26, as shown in FIG. 1. Likewise, second strands 26 have a strand density which can be measured over a predetermined length B of a first strand 24. The phrase "strand cross-sectional area", as used herein, is intended to mean the cross-sectional area of any first strand 24 when measured according to techniques known in the art.

The melt index of a polymer measures the ability of the polymer to flow when subjected to a given temperature or pressure. A polymer having a low melt index will be more viscous (and therefore not flow as readily) at a given temperature than a polymer having a higher melt index. Thus, it is believed that first strands 24 comprising a polymer having a high melt index will have a greater tendency to merge or overlap during application of a given pressure and heat flux than first strands 24 comprising a polymer having a lower melt index and subjected to the same pressure and heat flux. Because of this variability, the polymer forming first strands 24 can be selectively chosen, in conjunction with the strand density and strand cross-sectional area, to provide a predetermined melt index such that first strands 24 are integrally bonded to first and second carrier layer 37 and 38 with a strand coverage $S_c$ of about 50 percent. In addition, varying the polymer melt index can also be especially useful where it is desired to increase the density of first and second carrier layers 37 and 38 while maintaining the same processing conditions. In this situation, the polymer of first strands 24 can be changed to provide a higher melt index such that first strands 24 can more easily penetrate and bond with carrier layer 37 and 38 when subjected to a predetermined pressure and heat flux. Consequently, the same level of integral bonding can be achieved without changing the processing conditions despite the increased density of carrier layers 37 and 38.

Based upon the foregoing, it is believed that first strands 24 should preferably be aligned so as to provide a strand density of from about 2 to about 10 strands per centimeter in conjunction with a strand cross-sectional area of from about 0.0005 cm$^2$ to about 0.03 cm$^2$, more preferably from about 3 to about 6 strands per centimeter in conjunction with a strand cross-sectional area of from about 0.001 cm$^2$ to about 0.005 cm$^2$, so that merger or overlap of integrally bonded first strands 25 in laminate structure 66 can be avoided. A melt index of from about 2 to about 15 (as measured per ASTM D1238) in conjunction with the above-described strand density and strand cross-sectional area values has been found to be satisfactory.

With regard to second strands 26, it is believed that the strand density, strand cross-sectional area, and modulus of second strands 26 can also affect the elastic properties of laminate structure 66 (i.e., the modulus of laminate structures 66) in the direction along the second strands 26 (i.e., along direction D of FIG. 2). For example, as the strand density and/or the strand cross-sectional area of second strands 26 increases, the modulus of laminate structure 66 will decrease. For laminate structures 66 to be incorporated into the disposable elastic back wrap of the present invention, it is desirable that a modulus of from about 100 to about 250 grams force per cm, at a strain $\epsilon_\mu$ of about 1 be provided. It is believed that providing second strands 26 having a strand density of from about 2 to about 5, a cross-sectional area of from about 0.003 cm$^2$ to about 0.02 cm$^2$, and comprising a styrene butadiene block copolymer will provide laminate structures 66 having the preferred modulus in a direction along second strands 26. The modulus of laminate structure 66 can be measured by techniques known in the art. For example, the modulus of laminate structure 66 can be measured using a universal constant rate of elongation tensile tester, such as Instron Model #1122, manufactured by Instron Engineering Corp., Canton, Mass.

Laminate structure 66 can also be subjected to various additional post-formation processes known in the art. For example, a laminate structure made in accordance herewith can comprise additional fabric layers (i.e., bulking layers) which are joined to the laminate structure so as to further improve the wearability and comfort of the structure. The additional fabric layers can be secured to the laminate structure by adhesive, thermal bonding, pressure bonding, ultrasonic bonding, dynamic mechanical bonding, or any other suitable methods known in the art.

Having shown and described the preferred embodiments of the present invention, further adaptation of the improved elastic laminate structure can be accomplished by appropriate modifications by one of ordinary skill in the art without departing from the scope of the present invention. A number of alternatives and modifications have been described herein and others will be apparent to those skilled in the art. For example, broad ranges for the physically measurable parameters have been disclosed for the inventive elastic laminate structure as preferred embodiments of the present invention, yet it is contemplated that the physical parameters of the elastic laminate structure can be varied to produce other preferred embodiments of improved elastic laminate structures of the present invention as desired. In addition, it should be readily apparent that the alignment, properties, and composition of first strands 24 can be interchanged with those of second strands 26, or additional strands can be provided (e.g., a plurality of third strands etc.) to alter or enhance the properties of an elastic laminate structure made in accordance with this invention. Accordingly, the scope of the present invention should be considered in terms of the following claims and is understood not to be limited to the details of the structures and methods shown and described in the specification and drawings.

What is claimed is:

1. A method of manufacturing elastic laminate structures comprises the steps of:
    a) providing a first carrier layer;
    b) providing a second carrier layer;
    c) providing a mesh, disposed between said first and second carrier layers, having a plurality of first strands intersecting a plurality of second strands, said first and second strands having a softening temperature at an applied pressure, wherein said softening temperature of said second strands, at said applied pressure, is greater than said softening temperature of said first strands at said applied pressure;
    d) heating said mesh to said softening temperature of said first strands and less than said softening temperature of said second strands;
    e) applying a bonding pressure to said first strands; and
    f) integrally bonding from about 10% to about 100% by weight, of said first strands to said first and second carrier layers.

2. A method of manufacturing elastic laminate structures according to claim 1 wherein at least about 50% by weight, of said first strands are integrally bonded to said first and second carrier layers.

3. A method of manufacturing elastic laminate structures according to claim 2 wherein at least about 90% by weight, of said first strands are integrally bonded to said first and second carrier layers.

4. A method of manufacturing elastic laminate structures according to claim 1 wherein the outer surface of said first strands penetrate at least about 10% of the structural thickness of said first and second carrier layers.

5. A method of manufacturing elastic laminate structures according to claim 4 wherein the outer surface of said first strands penetrate at least about 50% of the structural thickness of said first and second carrier layers.

6. A method of manufacturing elastic laminate structures according to claim 5 wherein the outer surface of said first strands penetrate at least about 75% of the structural thickness of said first and second carrier layers.

7. A method of manufacturing elastic laminate structures according to claim 1 wherein said softening temperature of said first strands is at least 10° C. lower, at said applied pressure, than said softening temperature of said second strands.

8. A method of manufacturing elastic laminate structures according to claim 7 wherein said softening temperature of said first strands is at least 20° C. lower, at said applied pressure, than said softening temperature of said second strands.

9. A method of manufacturing elastic laminate structures according to claim 1 wherein at least about 50% by weight, of said integrally bonded first strands are deformed to a flat shape and are coplanar with said first and second carrier layers.

10. A method of manufacturing elastic laminate structures according to claim 9 wherein at least about 75% by weight, of said integrally bonded first strands are deformed to a flat shape and are coplanar with said first and second carrier layers.

11. A method of manufacturing elastic laminate structures according to claim 1 wherein at least 25% by weight, of said second strands are deformed to a substantially elliptical cross-sectional shape.

12. A method of manufacturing elastic laminate structures according to claim 11 wherein at least 50% by weight, of said second strands are deformed to a substantially elliptical cross-sectional shape.

13. A method of manufacturing elastic laminate structures according to claim 12 wherein at least 75% by weight, of said second strands are deformed to a substantially elliptical cross-sectional shape.

14. A method of manufacturing elastic laminate structures according to claim 1 wherein said first carrier layer is juxtaposed said mesh which is juxtaposed said second carrier layer, wherein said juxtaposed first carrier layer, mesh, and second carrier layer pass over a substantially non-resilient first surface, and a substantially non-resilient second surface, wherein said surfaces are provided in the form of rollers.

15. A method of manufacturing elastic laminate structures according to claim 14 wherein said first and second surfaces are heated to a temperature sufficient to raise the temperature of said first strands to said softening temperature of said first strands.

16. A method of manufacturing elastic laminate structures according to claim 15 wherein said first surface is spaced adjacent said second surface forming a gap therebetween such that said juxtaposed first carrier layer, mesh, and second carrier layer pass easily therethrough said gap.

17. A method of manufacturing elastic laminate structures according to claim 16 wherein said second surface is positioned adjacent a substantially resilient third surface forming an interference nip therebetween such that from about 10% to about 100% of said first strands are integrally bonded to said first and second carrier layers when said juxtaposed first carrier layer, mesh, and second carrier layer pass through said nip.

* * * * *